UNITED STATES PATENT OFFICE.

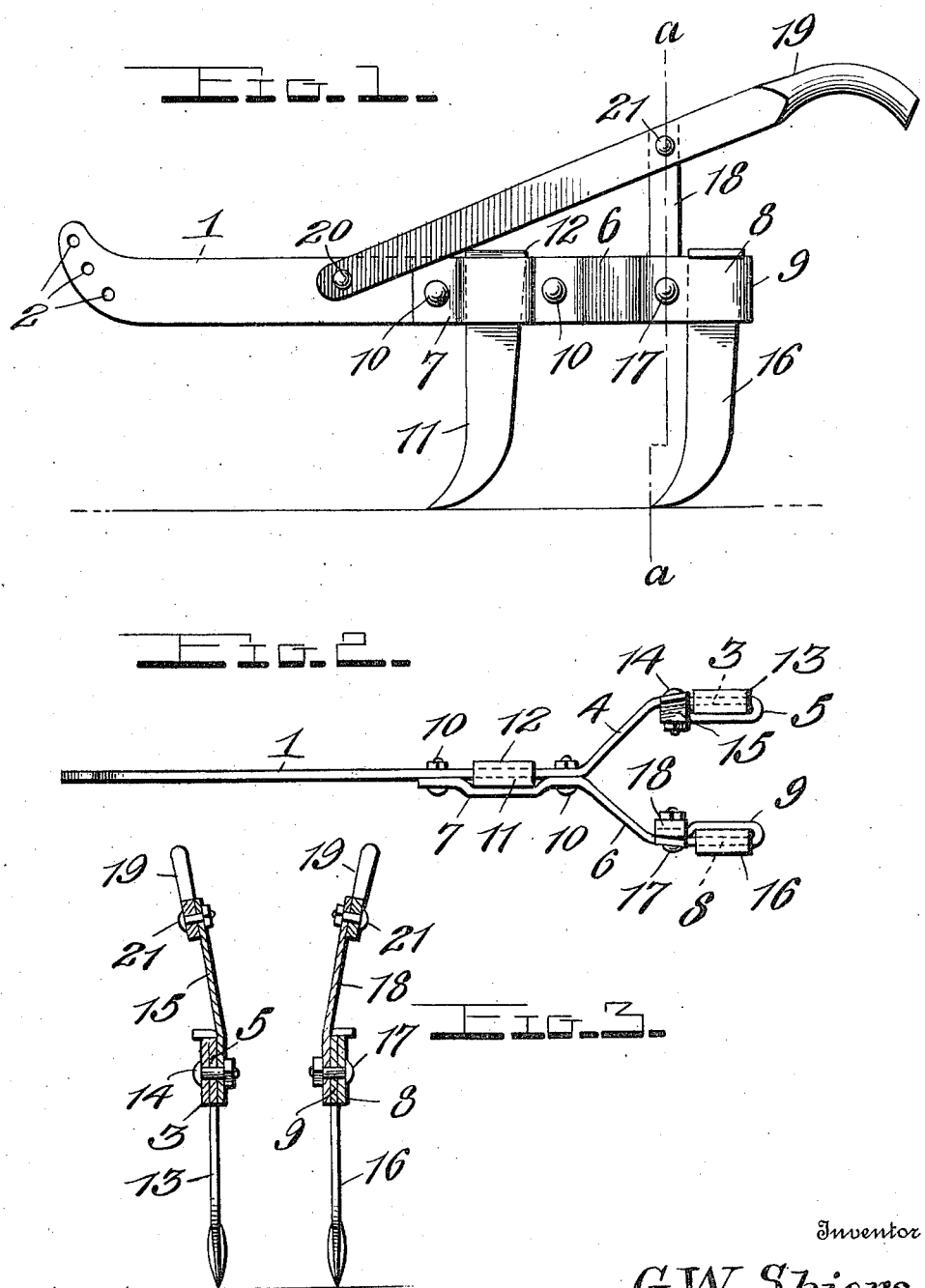

GEORGE W. SPIERS, OF CAESAR, MISSISSIPPI.

CULTIVATOR.

974,840.  Specification of Letters Patent.  Patented Nov. 8, 1910.

Application filed August 8, 1910. Serial No. 576,093.

*To all whom it may concern:*

Be it known that I, GEORGE W. SPIERS, a citizen of the United States, residing at Caesar, in the county of Hancock and State of Mississippi, have invented certain new and useful Improvements in Cultivators, of which the following is a specification, reference being had to the accompanying drawings.

This invention is an improved cultivator and subsoil plow adapted for use for cultivating growing crops and also for use in stirring the subsoil in the furrow behind a turning plow so as to break up the subsoil without bringing it to the surface, the invention consisting in the construction, combination and arrangement of devices hereinafter described and claimed.

In the accompanying drawings—Figure 1 is a side elevation of a cultivator and subsoil plow constructed in accordance with my invention. Fig. 2 is a plan of the same with the handles removed. Fig. 3 is a sectional view of the same on the plane indicated by the line $a$—$a$ of Fig. 1.

The beam 1 of my cultivator and subsoil plow is made of iron or steel plate and is comparatively broad in its vertical dimension and thin in its transverse or horizontal dimension. The front end of the beam is slightly upturned and is provided with a series of openings 2 for the attachment of a clevis at any desired point. Formed with the beam and at the end thereof is a rearwardly extending arm 3 which is offset from the beam, the offset portion 4 which connects the said arm to the beam being at an angle of about 45° with reference to the beam. The arm 3 is formed with a clamping member 5 which is integral therewith and bent forwardly from the rear portion thereof and disposed on the inner side thereof. I also provide a detachable section 6 which is formed of iron or steel plate and has a forwardly extending front arm 7 to bear against the beam 1, a laterally offset rearwardly extending arm 8 opposed to and spaced from the arm 3 of the beam, and a clamping member 9 which is formed integral with the said arm 8 and is bent forwardly from the rear portion thereof, and disposed on the inner side thereof. The beam 1 and the portion 7 of the detachable section are provided with registering openings disposed one in advance of the other and through which a pair of clamping bolts 10 extend, the said bolts serving to clamp the section 6 to the beam and to also clamp the upper standard portion of a tooth 11 between said beam and said section 6. The said tooth has a relatively thin standard presenting broad flat opposite faces to bear between the standard 1 and the section 6, and the upper end of the said standard is bent laterally at right angles as at 12 to bear on the upper edge of the beam when the said tooth is in its lowermost adjusted position.

It will be understood from the foregoing that the bolts 10 which clamp the portion 7 of the section 6 to the beam 1, also serve to effectually clamp the standard of the tooth 11 between said beam and said section and admit of the detachment of the section so that it may be disposed to operate to any desired extent in the soil.

A tooth 13 which is identical in construction with the tooth 11 has its standard clamped between the arm 3 and the clamping member 5 by means of a bolt 14 which also serves to secure the lower end of a brace 15 to the said arm 3. A tooth 16 which is identical in construction with the teeth 11, 13 has its standard portion clamped between the arm 8 and the clamping member 9 by a bolt 17 which also serves to secure the lower end of a brace 18 to said arm 8.

It will be understood that the teeth 13, 16 may be vertically adjusted as may be required, and that they may be readily detached and replaced by others.

The handles 19 have their front ends secured on opposite sides of the beam 1 by means of a bolt 20. They are also secured to the upper ends of the braces 15, 18 by means of bolts 21.

My improved plow may be used for the purposes of a cultivator, and also as a subsoiler for operation in the furrows behind a turning plow so as to stir, loosen and lighten the clay and other subsoil without bringing the same to the surface. Moreover, my improved plow is extremely strong, simple and durable and may be manufactured at slight cost.

I claim:

The herein described cultivator and subsoil plow comprising a beam having a laterally offset arm at its rear end, formed therewith, the said arm having an integral forwardly extending clamping member at its rear end; a detachable section having a forwardly extending portion to bear against one side of the beam and further provided with a laterally off-set rearwardly extending arm having an integral forwardly extending clamping member at its rear end, a front tooth having its standard disposed between the beam and the forwardly extending portion of the detachable section, clamping bolts securing said section to the beam, and also detachably and adjustably securing said tooth between said section and beam, the teeth having their standards disposed between the rearwardly extending offset arms and the clamping members thereof, handle braces, and clamping bolts extending through said arms, said clamping members and said braces, and serving to secure the braces to the said arms, and to also clamp the standards of the rear teeth between said arms and said clamping members.

In testimony whereof I hereunto affix my signature in the presence of two witnesses.

GEORGE W. SPIERS.

Witnesses:
J. J. FORNEA,
ALEX. SPIERS.